INVENTORS
FRANZ NEUGEBAUER AND
LUDWIG WAGENSEIL
BY
ATTORNEY.

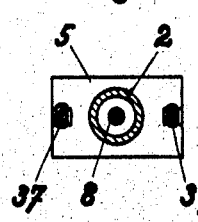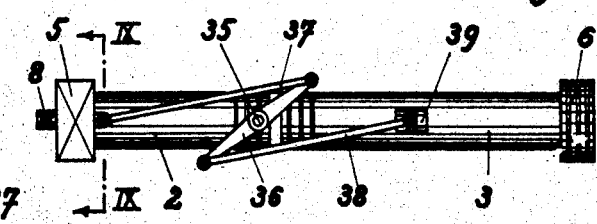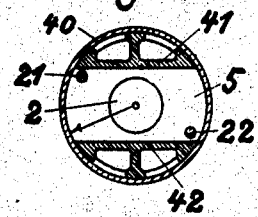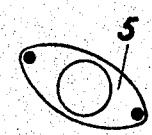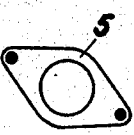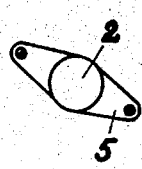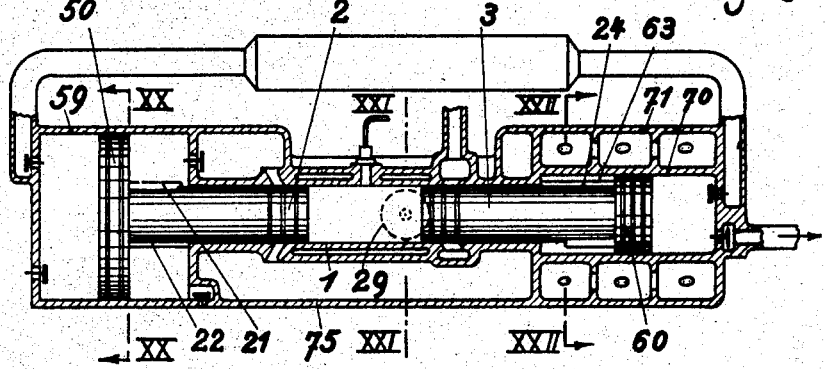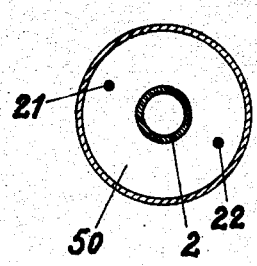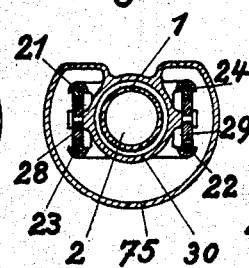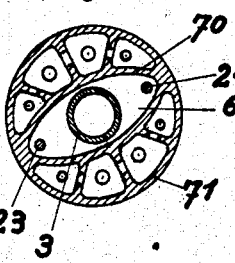

Oct. 23, 1945.  F. NEUGEBAUER ET AL  2,387,603
FREE PISTON MOTOR COMPRESSOR
Filed Nov. 12, 1941  3 Sheets-Sheet 3

Inventors:
Franz Neugebauer, Ludwig Wagenseil
by Paul Kirchland
Attorney

Patented Oct. 23, 1945

2,387,603

UNITED STATES PATENT OFFICE 2,387,603

FREE PISTON MOTOR COMPRESSOR

Franz Neugebauer, Munich-Allach, and Ludwig Wagenseil, Munich-Obermenzing, Germany; vested in the Alien Property Custodian Application November 12, 1941, Serial No. 418,665
In Germany October 22, 1940

4 Claims. (Cl. 123—46)

This invention relates to improvements in free piston motor compressors provided with oppositely moving flying masses, more especially to the cross-sectional outlines of the pistons and the arrangement of the gearing elements connected thereto.

In free piston motor compressors of the kind described the flying masses are connected with one another by a gearing ensuring their synchronous operation. Mechanical gearings of this kind are, as a rule, subdivided in two halves symmetrically arranged to the longitudinal axis on both longitudinal sides of the engine in order to avoid unilateral stresses. Rack-and-pinion or link gears are mostly used for this purpose. In the first case two racks are secured to each of the flying masses extending parallelly to the axis of the engine. The racks engage diametrically a pinion journaled on the engine casing. In the second case the pinion is replaced by a two-armed link. Each of its ends is engaged by a link the other ends of which are jointed to each of the flying masses. As the halves of the gearing have to be placed outside the walls confining the cooling space, the exhaust crown or other implements attached to the motor cylinder, the distance of the gearing elements from the axis of the engine becomes relatively great. If the compressor pistons have a radius greater than this distance, the gearing elements to be connected with the flying masses can be directly secured to these compressor pistons. Otherwise it would be necessary to connect a cross-head to a prolongation of the motor piston inserted between the motor piston and the compressor piston, this cross-head projecting outwards, for instance, through slots in the wall of the correspondingly prolonged motor cylinder, and to secure the gearing elements, to be connected with the flying masses, to the ends of the cross-head. Such cross-head not only complicates the engine, but above all entails the drawback that the engine, and also the flying mass are elongated by the length of the stroke of the cross-head. Hereby firstly the required place and the weight of the engine are enlarged, and secondly also the weight of the flying mass is increased, whereby the number of strokes per unit of time is reduced and in accordance the effect of the engine is diminished.

The object of the present invention is to afford the possibility of directly connecting the gearing elements to be combined with a flying mass to a compressor piston even in the case that the radius of the compressor piston is smaller than the required minimum distance of the halves of the gearing from the axis of the engine.

It may be noted that this requirement above all presents itself in connection with multistage compressors. If in this case a plurality of compressor stages is connected with a flying mass, the required compensation of forces and works involves that the piston of the lowest stage combined with this flying mass does not exceed a certain dimension. This is especially true when the compressor is symmetrically subdivided, i. e. when on each side of the engine a complete multistage compressor is arranged. On the other hand, if, for instance, in a two-stage compressor the piston of the first stage is connected with the one flying mass and the piston of the second stage with the other flying mass, the compressor piston of the first stage may, it is true, be given a sufficiently great diameter to connect the gearing directly with this piston, but this is impossible with the piston of the second stage.

According to the invention, even in the case that the radius of the greatest of the compressor pistons secured to the flying mass is too small to allow its connection with the gear elements within its circular face, this connection is rendered possible by giving this compressor piston an elongated cross-sectional outline deviating from a circle so that its projection from the axis of the engine in the direction of the greater geometrical axis becomes greater than the radius of the cylindrical piston, whereas the extension in the direction of the smaller geometrical axis is smaller than this radius.

This part of the compressor piston widely projecting from the engine axis is used for connecting the gear elements. The cross-sectional outline of this non-circular piston may be, for instance, a rectangle or a figure composed of one rectangle and two semicircles or an ellipse, a rhombus or the like. The "cylinder" in which this compressor piston reciprocates is given the same cross-sectional form as the piston. It is true that the wall of such a cylinder is less resistant to inner pressure than the usual circular cylindrical wall. But owing to the fact that here as a rule relatively low pressures are to be contemplated (in multistage compressors only the lower stages) the satisfactory reinforcement of the walls presents no difficulty. Likewise the packing of the non-circular piston may be satisfactorily effected by packing rings similar to the usual piston rings and yieldingly pressed against the cylinder wall so that, besides the more complicated manufacture of the non-circular pistons and "cylinders" no difficulties will occur. On the other hand, we obtain the advantage that the required place and the weight of the engine as well as the weight of the flying mass are diminished, even when the connection of the gear elements with the compressor piston is allowed only at one side of the engine. Likewise the space required for disconnecting the engine is correspondingly diminished. The invention is especially valuable in case it allows the connection of the gear elements at both sides of the engine because then the advantages: reduction of required place and reduction of weight of the engine and the flying mass are fully utilized.

The invention is illustrated, by way of example, in the annexed drawings of which:

Fig. 6 is a longitudinal cross-sectional plan view, and

Fig. 7 shows the moving parts (flying masses) of the engine in side elevation.

Figs. 8 and 9 show the same flying masses as Fig. 1 in connection with another coupling gear, Fig. 8 being a side elevation and Fig. 9 a vertical cross-section on the line IX—IX of Fig. 8.

Figs. 12 to 18 show different shapes of compressor pistons according to the invention.

Figs. 19 to 22 show a free piston motor compressor provided with two compressor stages, Fig. 19 being an axial cross-sectional side view, and Figs. 20 to 22 being vertical cross-sections on the lines XX, XXI and XXII of Fig. 19.

Figure 1:
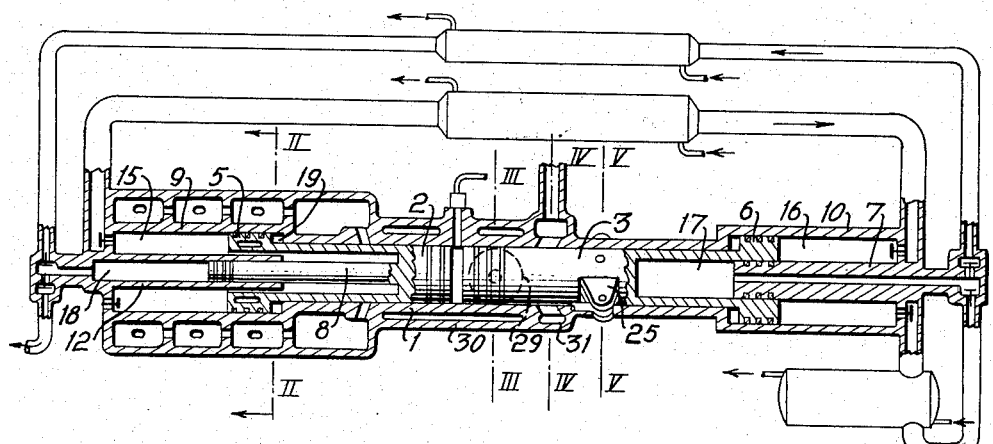
Figs. 1 to 7 show a free piston motor compressor with four-stage compression, Fig. 1 being a longitudinal cross-sectional side view, and Figs. 2 to 5 being vertical cross-sections on the lines II—II, III—III, IV—IV, and V—V of Fig. 1 respectively.

In the free piston motor compressor represented by Figs. 1 to 7 the two motor pistons 2, 3 oppositely reciprocate in a motor cylinder 1, the left motor piston 2 being connected with the compressor piston 5 of the first stage and with the compressor piston 8 of the fourth stage. The piston 5 in the compressor cylinder 9 acts upon the compressor space 15, the compressor piston 8 acts upon the compressor space 18 situated in the interior of cylinder 9.

Figure 2:
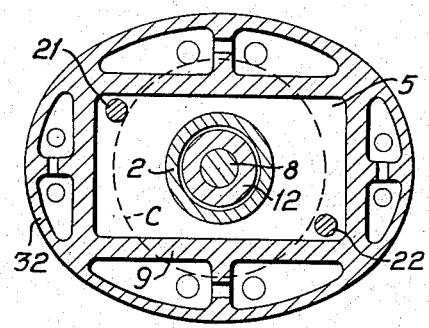
Figure 3:
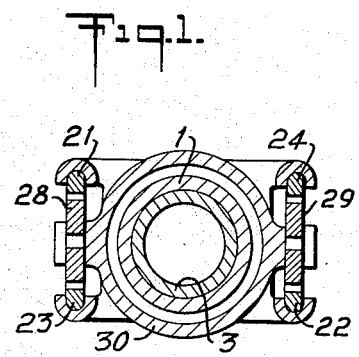
Figure 4:
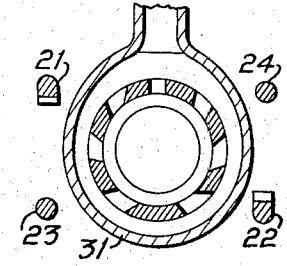
Figure 5:
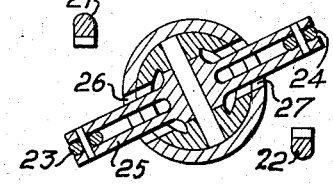
Figure 6:
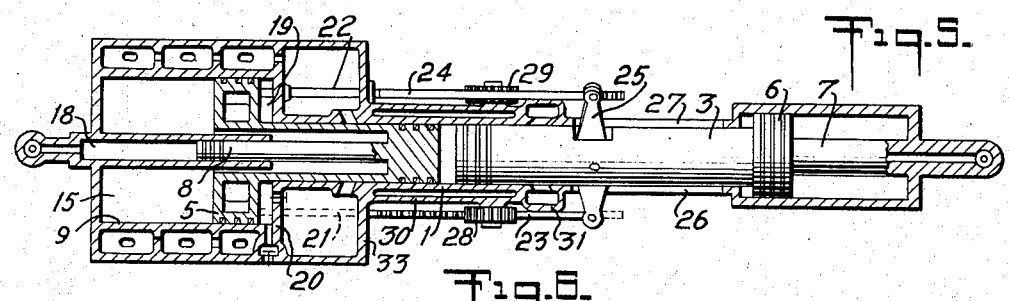
Figure 7:
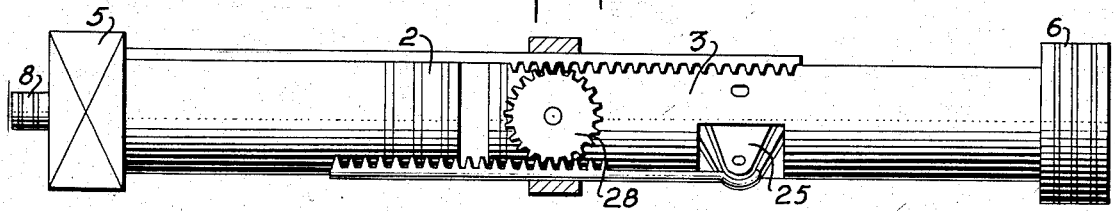
Figure 10:
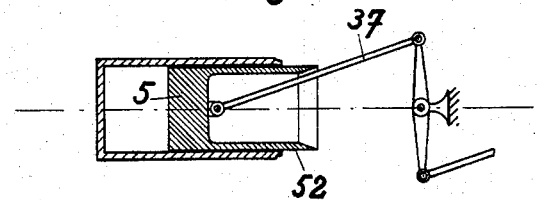
Figs. 10 and 11 show a special arrangement of the coupling gear, Fig. 10 being an axial longitudinal cross-section and Fig. 11 an axial cross-sectional plan view.
Figure 11:
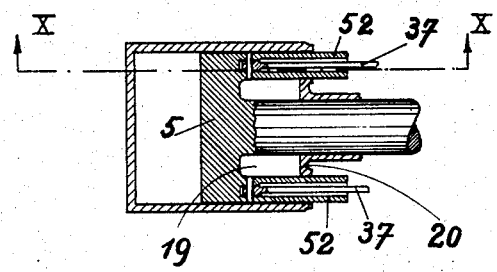

The motor piston 3 is connected with the compressor piston 6 of the second stage which acts in the compressor cylinder 10 upon the compressor space 16. The compressor piston 7 of the third stage is in this example shown arranged concentrically to the compressor cylinder 10 and integral therewith; it acts upon the compressor space 17 bored into the motor piston 3. To ensure synchronous reciprocation of the two flying masses formed by pistons 2, 5, 8 and 3, 6 respectively a rack-and-pinion gear of well-known construction arranged symmetrically to the axis of the engine is used. If the compressor piston 5 of the first stage were of cylindrical shape as indicated by the dotted circle C in Fig. 2, the racks 21, 22 to be connected with the flying mass 2, 5, 8 could not engage this piston because in view of the cooling jacket 30 and the exhaust crown 31 to be provided on motor cylinder 1 they must be arranged at so great a distance from the axis of the engine that they lie outside the circular face C. In order to nevertheless allow this connection, the cross-section of the piston 5 is made rectangular as shown in Fig. 2, so that the racks 21, 22 fall within the outline of this rectangle. The walls comprising the compressor cylinder 9 are correspondingly plane. To reinforce these walls against the inner pressure they are encompassed, as shown in Fig. 2, by an elliptic mantle 32 vaulting the plane walls and connected with said walls by longitudinal or transverse ribs. The space between both cylinder walls may serve as an additional receiver for scavenging air. The space 19 formed between the piston 5 and the cylinder 9 on the side turned toward the motor part serves as scavenging pump in the well-known manner. The racks 21 and 22 extensions beyond the teeth are in this case passed through airtight holes in the front wall 33 and in the wall 20 of the compressor (Fig. 6). On the right side of the engine the racks 23, 24 engaging the flying mass 3, 6 are connected to the cross-head 25 integral with the motor piston 3 and projecting outwards through longitudinal slots 26, 27 of the motor cylinder 1. The racks 21, 23 and 22, 24 lying on the same respective side of the engine engage at diametrically opposed points the pinions 28, 29 respectively. Each of these pinions is rotatably, but not shiftably journaled on the mantle 30 of the motor cylinder 1.

By shaping the piston 5 of the first compressor stage according to the invention with a flat rectangular outline on the left side of the engine, place is saved which otherwise would be required for lodging and reciprocating the cross-head which would have to be provided in the case of a compressor piston having the usual circular cross-section. Consequently, the total length of the plant is essentially reduced. It is in the same sense that act in the example shown the lodgment of the high pressure cylinder 12 in the low pressure cylinder 9, known in itself and the lodgment of one compression stage (working space 17) in the motor piston. Hereby we attain that this engine comprising a four-stage compressor requires no more space than a normal engine working with the same stroke of flying masses and having only a two-stage compressor with one stage at each side of the engine.

Figs. 8 to 11 show the flying masses of the same engine provided with link-gearing. On each longitudinal side of the engine a two-armed lever 36 is journaled on a pivot 35 fixed in the frame of the engine. The ends of this lever 36 are engaged by two links 37 and 38. The other ends of the links 37 are linked to the rectangular piston 5, and the other ends of the links 38 are jointed to the cross-head 39 integral with the piston 3. Also in this case the enlarged lateral projection of the rectangular piston 5, as compared with the circular outline C in Fig. 2 permits of the immediate connection of the gear elements 37 with the piston.

The advantages of the invention thus appear similarly when using this kind of connecting gear. In order that in this case the space 19 (on the right side of the piston 5) may also serve as working space, for instance, of a scavenging pump, the links 37 (Figs. 10, 11) oscillate in pockets 52 originating from the piston 5 and tightly passed outwards through the front wall 20.

The outline of the piston 5 shown in Fig. 12 may be imagined as being produced by cutting off two opposite segments from a circular face. This form is advantageous for manufacturing the compressor cylinders. Into a cylinder 40 with cylindrical bore two segmental pieces 41, 42 are inserted so that the plane walls of these segments together with the uncovered parts of the cylinder 40 encompass the piston 5.

In Fig. 13 the outline of the piston 5 is formed by a rectangle and two semicircles.

Fig. 14 shows an elliptic outline, Fig. 15 a rhombic outline with rounded angles of the piston 5.

According to Fig. 16 the rhombus is so flat that its sides become tangents to the motor piston 2.

Figure 17:
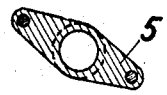

To further reduce the effective face of the compressor piston 5, one may make a stationary piston project through the compressor piston and into the motor piston, as, for instance, the piston 7 into the piston 3 (Fig. 1) so that as the effective cross-section of the piston may be considered the hatched face in Fig. 17.

Figure 18:

If it is desired to further diminish the effective cross-section of the piston, besides the one stationary piston arranged concentrically to the axis of the engine, alongside the latter other stationary pistons may be provided tightly penetrating the compressor piston. The effective cross-section of the piston then corresponds to the hatched face in Fig. 18.

Figs. 19 to 22 show a free piston motor compressor provided with a two-stage compressor.

The piston 50 of the first compressing stage has in this case a diameter sufficient to permit of the immediate connection of the racks 21, 22 of the coupling-gear with this piston having the usual cylindrical form. However the piston 60 of the second compressing stage, when shaped in the usual form, becomes only a little greater than the motor piston. Therefore in the present example this piston is given an elongated outline in the form of a flat ellipse as shown in Fig. 22. For reinforcing the wall 70 of the elliptic compressor cylinder a second cylindrical wall 71 is placed around it, and between both walls 70 and 71 longitudinal and transverse ribs are provided, so that the cylinder sustains the relatively high pressure of the second compression stage. The racks 23, 24 may now immediately engage the piston 60 of the second compressing stage so that again no cross-head is required for connecting the racks 23, 24 to the flying mass 3, 60. Again the length of the engine required for lodging and reciprocating the cross-head is saved, whereby the place required and the weight of the engine and that of the flying mass are correspondingly reduced. This engine with the two-stage compressor needs no more place than a quite symmetrical engine having one one-stage compressor on each side, the piston of which permits of connecting the elements of the coupling-gear to be attached to the flying masses immediately with these pistons.

The space 63 situated at the left side of the piston 60 turned toward the motor part may either communicate with the atmosphere or with a working space serving, for instance, as an additional scavenging pump, a buffer or the like. The coupling gear is in this example wholly lodged in the scavenging-pump casing 75 connecting the compressor cylinder 59 of the first stage with the cylinder 70 of the second stage.

We claim:

1. In a free piston, internal combustion engine, multi-stage compressor, the combination of a cylinder; a pair of opposed driving pistons reciprocable in said cylinder; means for reciprocating said pistons; a pair of cylinders co-axial with and symmetrically disposed on opposite ends of said first cylinder; a compressor piston reciprocable in each cylinder of said pair, the compressor pistons being connected with the driving pistons, respectively, the cross-sectional area of one of said compression pistons being limited to a certain permissible maximum by the degree of compression to be produced by said piston, said piston having the permissible maximum cross-sectional area defined by a non-circular outline, and having major and minor axes larger and smaller respectively than the diameter of a circular outline defining an equal cross-sectional area; a mechanical gear connecting said compressor pistons to ensure synchronous action thereof, said gear being disposed parallel to and symmetrically about the common axis of the several cylinders, and connected to the said compression piston whose cross-sectional area is limited, at points on the major axis of said piston beyond the termini of said diameter.

2. In a free piston internal combustion engine motor compressor in accordance with claim 1, a compressor piston having a cross-section in form of a flat rectangle.

3. In a free piston internal combustion engine motor compressor in accordance with claim 1, a compressor piston having a cross-section in form of a circle from which two opposite segments have been cut off.

4. In a free piston internal combustion engine motor compressor in accordance with claim 1, a compressor piston having a cross-section in form of an ellipse.

FRANZ NEUGEBAUER.
LUDWIG WAGENSEIL.